(12) United States Patent
Asai et al.

(10) Patent No.: US 11,661,013 B2
(45) Date of Patent: May 30, 2023

(54) LIGHT-BLOCKING MEMBER AND LIGHT-BLOCKING STRUCTURE

(71) Applicants: HAYASHI TELEMPU CORPORATION, Nagoya (JP); TOYOTA JIDOSHA KABUSHIKI KAISHA, Toyota (JP)

(72) Inventors: Hiroaki Asai, Nagoya (JP); Madoka Doi, Toyota (JP)

(73) Assignees: HAYASHI TELEMPU CORPORATION, Nagoya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 612 days.

(21) Appl. No.: 16/500,153

(22) PCT Filed: Mar. 28, 2018

(86) PCT No.: PCT/JP2018/012919
§ 371 (c)(1),
(2) Date: Oct. 2, 2019

(87) PCT Pub. No.: WO2018/186266
PCT Pub. Date: Oct. 11, 2018

(65) Prior Publication Data
US 2020/0391663 A1    Dec. 17, 2020

(30) Foreign Application Priority Data
Apr. 3, 2017   (JP) .............................. JP2017-073591

(51) Int. Cl.
*B60R 5/04*    (2006.01)

(52) U.S. Cl.
CPC .................................... *B60R 5/045* (2013.01)

(58) Field of Classification Search
CPC . B60J 1/2011; B60J 1/2091; B60J 3/00; B60J 11/06; B60J 11/08; B60J 11/10;
(Continued)

(56) References Cited

U.S. PATENT DOCUMENTS 3,923,339 A * 12/1975 McDonald ................ F41H 5/00
160/370.21
4,708,388 A * 11/1987 Zacharczuk ........... B60J 1/2091
116/28 R
(Continued)

FOREIGN PATENT DOCUMENTS

| JP | 5-26549 U | 4/1993 |
| JP | 5-32695 U | 4/1993 |

(Continued)

OTHER PUBLICATIONS

International Search Report dated Apr. 24, 2018 in PCT/JP2018/012919 filed Mar. 28, 2018.
(Continued)

*Primary Examiner* — Christopher Garft
*Assistant Examiner* — Michael McDuffle
(74) *Attorney, Agent, or Firm* — Oblon, McClelland, Maier & Neustadt, L.L.P.

(57) ABSTRACT

To provide a light-blocking member that can be easily folded. Wire 12 is bendable and deformable, and is attached to sheet member 11 so as to surround an outer peripheral part of substantially rectangular sheet member 11. Handle members 14 and 15 are attached to both ends of one side of sheet member 11, and are fixed to wire 12.

5 Claims, 19 Drawing Sheets

(58) Field of Classification Search
CPC .......... B60R 5/045; B60R 5/044; B60R 5/04; E04H 15/40; E04H 15/58; A45B 2023/0093
USPC ............ 160/354, 370.21, 351; 116/28 R, 32; 40/591, 593, 603, 604, 606.12, 606.14, 40/610; 135/126, 117
See application file for complete search history.

(56) References Cited

U.S. PATENT DOCUMENTS

| | | | | |
|---|---|---|---|---|
| 5,547,187 | A * | 8/1996 | Spykerman | B60R 5/045 296/37.16 |
| 5,570,921 | A * | 11/1996 | Brooker | B60R 7/02 296/39.1 |
| 6,394,528 | B2 * | 5/2002 | Hoenack | B60J 11/00 160/370.21 |
| 6,406,085 | B1 * | 6/2002 | Stanesic | B60R 5/045 296/97.23 |
| 6,644,716 | B1 * | 11/2003 | McNabb | B60J 11/00 296/136.11 |
| 8,042,292 | B2 * | 10/2011 | Gibb | G09F 17/00 160/354 |
| 9,315,156 | B1 * | 4/2016 | Nedelman | B60R 5/045 |
| 9,499,030 | B1 * | 11/2016 | Gong | B60J 1/2011 |
| 9,797,160 | B2 * | 10/2017 | Lin | B60R 5/045 |
| 9,802,548 | B2 * | 10/2017 | Wilson | B60J 7/141 |
| 9,925,855 | B2 * | 3/2018 | Joao | B60J 11/08 |
| 10,160,381 | B1 * | 12/2018 | Hernandez Covarrubias | B60R 5/045 |
| 10,850,884 | B1 * | 12/2020 | Bar | B65F 1/10 |
| 2005/0083776 | A1 | 4/2005 | Shoemaker | |
| 2005/0146158 | A1 * | 7/2005 | Schmeichel | B60J 7/102 296/100.16 |
| 2007/0286013 | A1 * | 12/2007 | Shoemaker | B01F 35/30 366/130 |
| 2008/0142503 | A1 * | 6/2008 | Li | F24C 15/2042 99/450 |
| 2015/0075736 | A1 * | 3/2015 | Gong | B60J 1/2011 160/370.21 |
| 2018/0222392 | A1 * | 8/2018 | Xiong | B60R 5/045 |
| 2019/0168585 | A1 * | 6/2019 | Callaghan | B60J 1/16 |
| 2019/0352045 | A1 * | 11/2019 | Ahumada | B65D 7/24 |
| 2020/0353848 | A1 * | 11/2020 | Knaust | B60R 13/013 |
| 2021/0051862 | A1 * | 2/2021 | Sharkey | B65F 1/1473 |
| 2021/0146843 | A1 * | 5/2021 | Asai | B60R 5/045 |
| 2022/0048435 | A1 * | 2/2022 | Salewski | B60R 5/045 |

FOREIGN PATENT DOCUMENTS

| | | |
|---|---|---|
| JP | 6-55934 A | 3/1994 |
| JP | 11-129816 A | 5/1999 |
| JP | 2001-158298 A | 6/2001 |
| JP | 3291647 B2 | 6/2002 |
| JP | 2003-260738 A | 9/2003 |
| JP | 2007-67920 A | 3/2007 |
| JP | 2009-132233 A | 6/2009 |
| JP | 2013-192725 A | 9/2013 |
| JP | 2014-108666 A | 6/2014 |
| JP | 2014108666 A * | 6/2014 |
| JP | 2015-081016 A | 4/2015 |

OTHER PUBLICATIONS

Japanses Office Action dated Apr. 21, 2020, in Patent Application No. 2019-51187, 5 pages (with English translation).

Chinese Office Action dated in Chinese Patent Application No. 201880023337.0 dated Jul. 5, 2022. (w/ English translation).

* cited by examiner

Front-back direction of automobile

Front-back direction of automobile

Front side of automobile

LIGHT-BLOCKING MEMBER AND LIGHT-BLOCKING STRUCTURE

TECHNICAL FIELD

The present invention relates to a light-blocking member, and particularly to a light-blocking member for a vehicle luggage compartment.

BACKGROUND ART

In a hatchback type automobile, a luggage compartment is generally provided at the rear. A sheet-like light-blocking member called a tonneau cover is attached above the luggage compartment in order to prevent luggage or the like in the luggage compartment from being visually recognized from the outside of the automobile. It is difficult to take the luggage in and out of a luggage compartment when the tonneau cover is in the attached state, and therefore the tonneau cover can be generally attached and detached by a user. Additionally, there is also known a tonneau cover that can be folded small so that the detached tonneau cover can be stored.

For example, Patent Document 1 discloses a foldable tonneau cover for a vehicle. In order to fold the tonneau cover described in Patent Document 1, a user first holds longitudinal both ends of the tonneau cover, bends the tonneau cover from both sides so as to bring both ends close, and folds a portion sandwiched between the held both ends while twisting the sandwiched portion in the predetermined direction. Consequently, it is possible to fold the tonneau cover in a triple ring shape.

PRIOR ART DOCUMENT

Patent Document

Patent Document 1: JP3291647B

SUMMARY OF INVENTION

Problem to Be Solved by the Invention

However, in a technology described in Patent Document 1, when the tonneau cover is folded, a complicated operation such as twisting of the tonneau cover in the predetermined direction is necessary after the longitudinal both ends of the tonneau cover are held and the tonneau cover is bent. Therefore, it is difficult to fold the tonneau cover. Particularly, it is difficult to find a place for holding the tonneau cover, and difficult to find the direction in which the tonneau cover should be twisted, so that this is a burden to a user.

The present invention has been made in view of the aforementioned problem, and an object of the present invention is to provide a light-blocking member that can be easily folded.

Means to Solve the Problem

A light-blocking member of the present invention comprising: a substantially rectangular sheet member; a bendable and deformable wire that is attached to the sheet member so as to surround an outer peripheral part of the sheet member; and handle members that are attached to both ends of one side of the sheet member and that are fixed to said wire.

Advantageous Effect of Invention

According to the present invention, the light-blocking member can be easily folded.

EMBODIMENTS OF THE INVENTION

Figure 1:
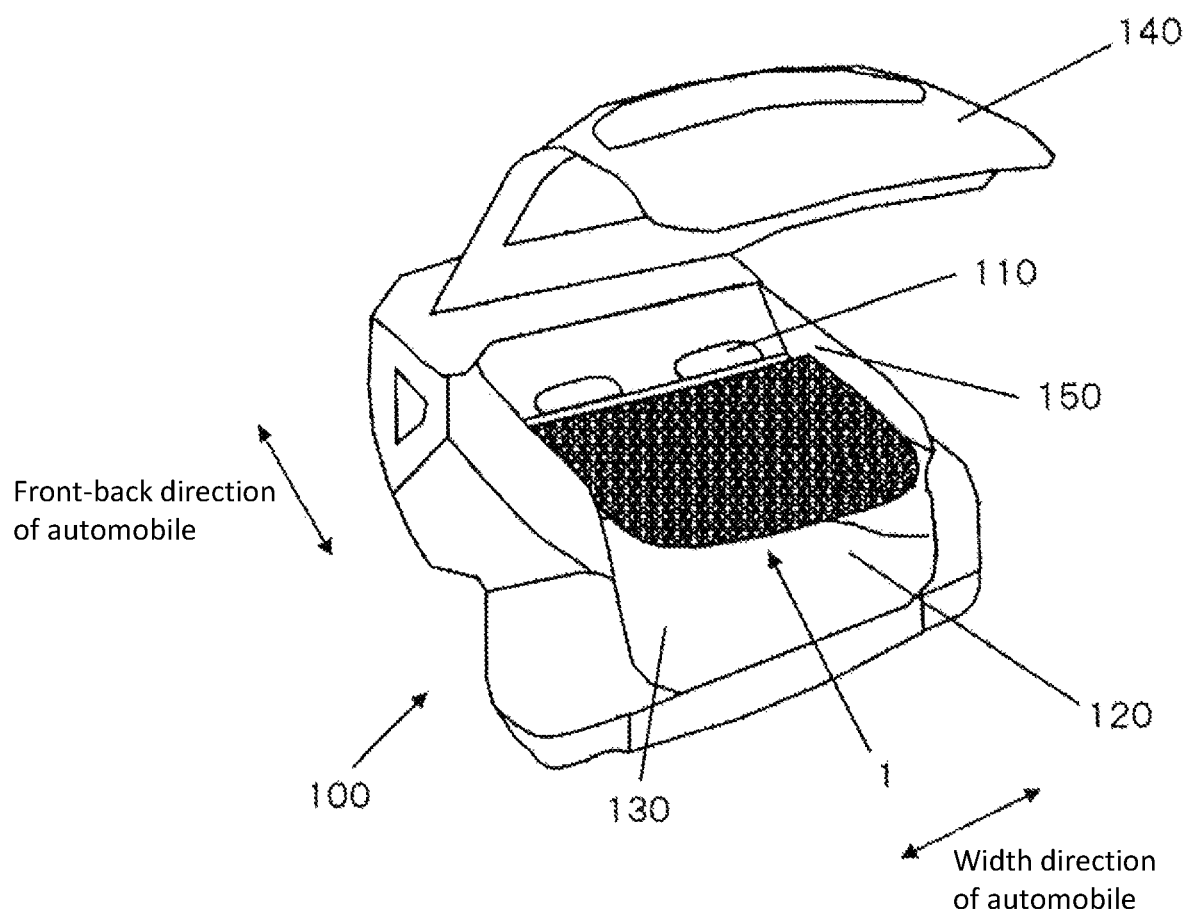
FIG. 1 is a perspective view of an automobile, to which a tonneau cover as a light-blocking member of a first embodiment of the present invention is attached, the automobile being viewed from a rear side of a luggage compartment.

Hereinafter, embodiments of the present invention will be described with reference to the drawings. Parts having the same functions in the respective drawings are denoted by the same reference numerals, and the description thereof will be sometimes omitted.

First Embodiment

FIG. 1 is a perspective view of an automobile, to which a tonneau cover as a light-blocking member of a first embodiment of the present invention is attached, the automobile being viewed from a rear side. Automobile 100 illustrated in FIG. 1 is a so-called hatchback type automobile, but is not limited to the hatchback type automobile as long as automobile 100 is an automobile to which the tonneau cover is attached. Automobile 100 includes luggage compartment 120 that houses luggage, behind back seat 110. Luggage compartment 120 is partitioned by a seat back of back seat 110, luggage compartment floor 130, vertically openable back door 140, and side walls 150. Luggage compartment floor 130 is composed of an interior material on a floor panel. Side walls 150 are composed of interior materials like deck side trims. FIG. 1 illustrates automobile 100 in which back door 140 is opened.

Tonneau cover 1 that is a sheet-like light-blocking member is substantially horizontally attached above luggage compartment 120. Tonneau cover 1 can shield an upper part of luggage compartment 120 by covering luggage compartment 120. Tonneau cover 1 has a substantially rectangular shape, and is attached such that the longitudinal direction is substantially parallel to the vehicle width direction that is the width direction of automobile 100. When back door 140 is opened and luggage is taken in or out, in a case in which tonneau cover 1 shields the upper part of luggage compartment 120, it become difficult to take luggage in or out. Therefore, the automobile is designed such that the tonneau cover 1 can be attached and detached by the user.

Figure 2:
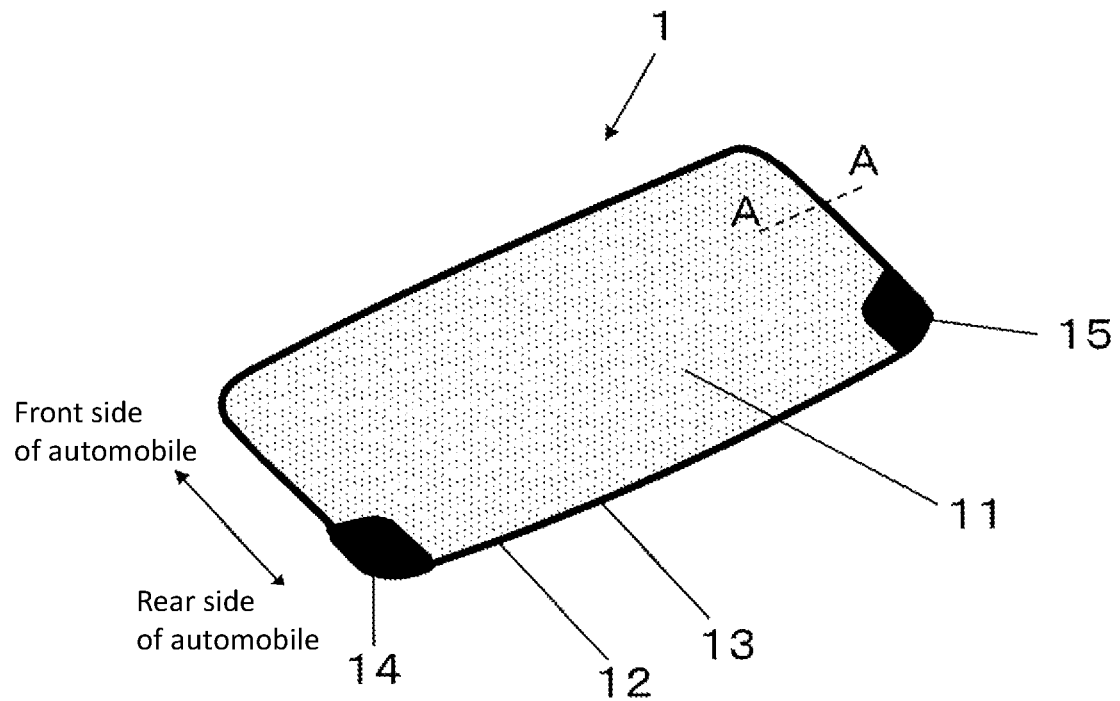
FIG. 2 is a perspective view illustrating the tonneau cover.
Figure 3:
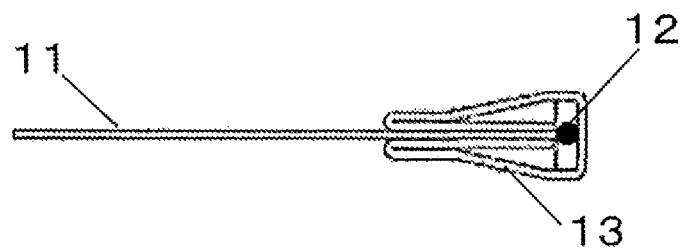
FIG. 3 is a sectional view taken along the line A-A of FIG. 2.

FIG. 2 is a perspective view illustrating a configuration of tonneau cover 1. FIG. 3 is a sectional view taken along line A-A in FIG. 2. As illustrated in FIG. 2, tonneau cover 1 has substantially rectangular sheet member 11, and wire 12 attached to an outer peripheral part of sheet member 11. Sheet member 11 covers luggage compartment 120, so that visual recognition of luggage or the like stored in luggage compartment 120 from the outside of the automobile becomes difficult. Sheet member 11 is a member having an elastic property, and is formed of jersey woven fabric such as nylon and polyester.

Wire 12 is an elastic member capable of being bendable and deformable, and is formed in a loop shape (closed shape). In this embodiment, wire 12 is formed in a substantially rectangular shape. Four corner parts of substantially rectangular wire 12 are formed in round corner shape. Wire 12 is attached to sheet member 11 so as to surround the outer peripheral part of sheet member 11, so that sheet member 11 is developed in a substantially rectangular shape.

A method for attaching wire 12 to sheet member 11 is not particularly limited. In this embodiment, as illustrated in FIG. 3, edging member 13 is sewed to the outer peripheral part of sheet member 11 in a bag shape, and wire 12 is disposed inside edging member 13 to be attached to sheet member 11. In this case, preferably, wire 12 is composed of a plurality of connectable members, and each member is inserted into edging member 13 that has been previously sewed to sheet member 11, and thereafter the plurality of members are connected, so that loop-shaped wire 12 is attached to sheet member 11. Additionally, alignment of sheet member 11 and wire 12 which has been previously formed in the loop shape, is carried out, and thereafter edging member 13 may be sewed so that wire 12 is attached to sheet member 11.

Edging member 13 is a member having an elastic property similar to sheet member 11, and is formed of jersey woven fabric such as nylon and polyester. Sheet member 11 and edging member 13 may be formed of the same material, or may be formed of different materials. Edging member 13 may not be provided, and for example, wire 12 may be directly attached to sheet member 11 by using adhesive or the like.

Handle members 14 and 15 for holding tonneau cover 1 by a user are attached to both ends of one of four sides of sheet member 11, that is, handle members 14 and 15 are attached to respective two corner parts adjacent to each other among the four corner parts of sheet member 11. Handle members 14 and 15 are desirably attached to both ends of one of long sides of sheet member 11. More desirably, as illustrated in FIG. 2, handle members 14 and 15 are attached to both ends of a long side disposed on a rear side of the vehicle (on back door 140 side of FIG. 1) in a state in which tonneau cover 1 is attached to automobile 100 as illustrated in FIG. 1.

Handle members 14 and 15 are configured such that handle members 14 and 15 are held by a user when tonneau cover 1 is folded, and wire 12 can be bent in a state in which the user holds handle members 14 and 15, so that tonneau cover 1 is folded. Therefore, handle members 14 and 15 are fixed to wire 12 such that the user can apply power to wire 12 through handle members 14 and 15. Materials and molding methods of handle members 14 and 15 are not particularly limited. Handle members 14 and 15 are each molded by, for example, an injection molding method using thermoplastic resin such as polypropylene.

Figure 4:
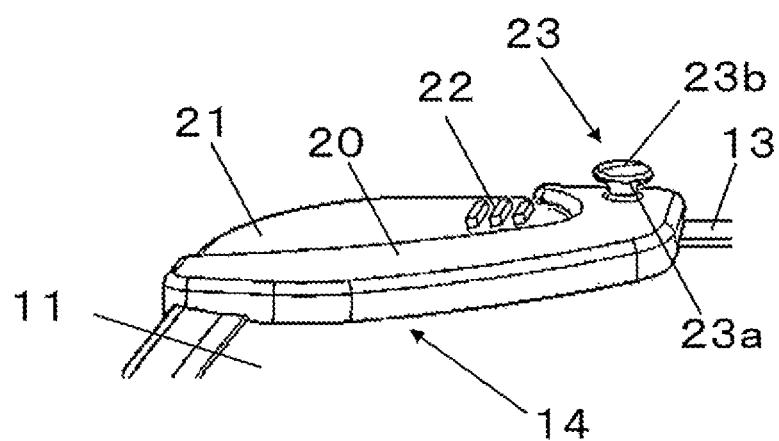
FIG. 4 is a perspective view illustrating a front surface of one handle member.
Figure 5:
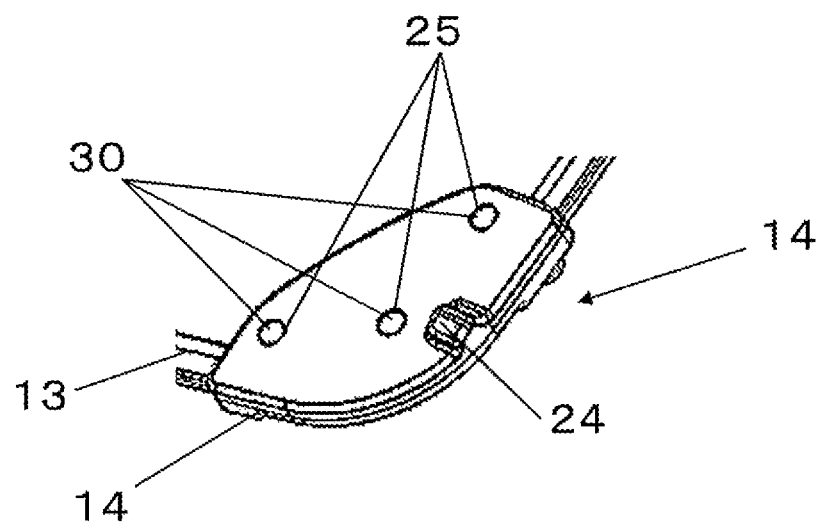
FIG. 5 is a perspective view illustrating a back surface of the one handle member.
Figure 6:
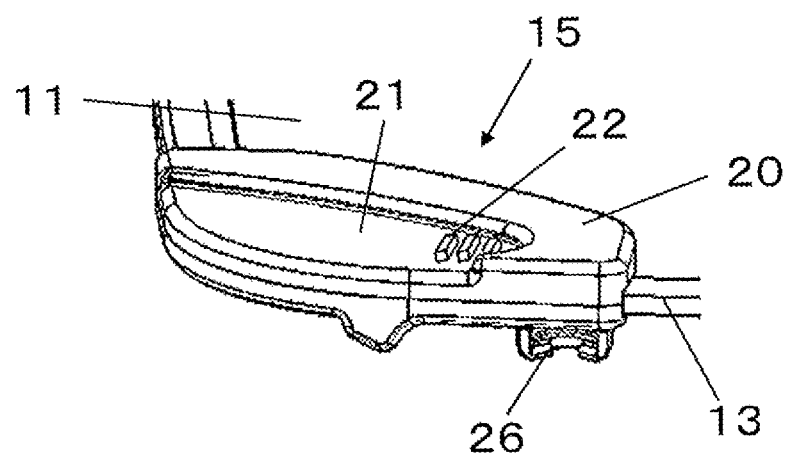
FIG. 6 is a perspective view illustrating the other handle member.
Figure 7A:
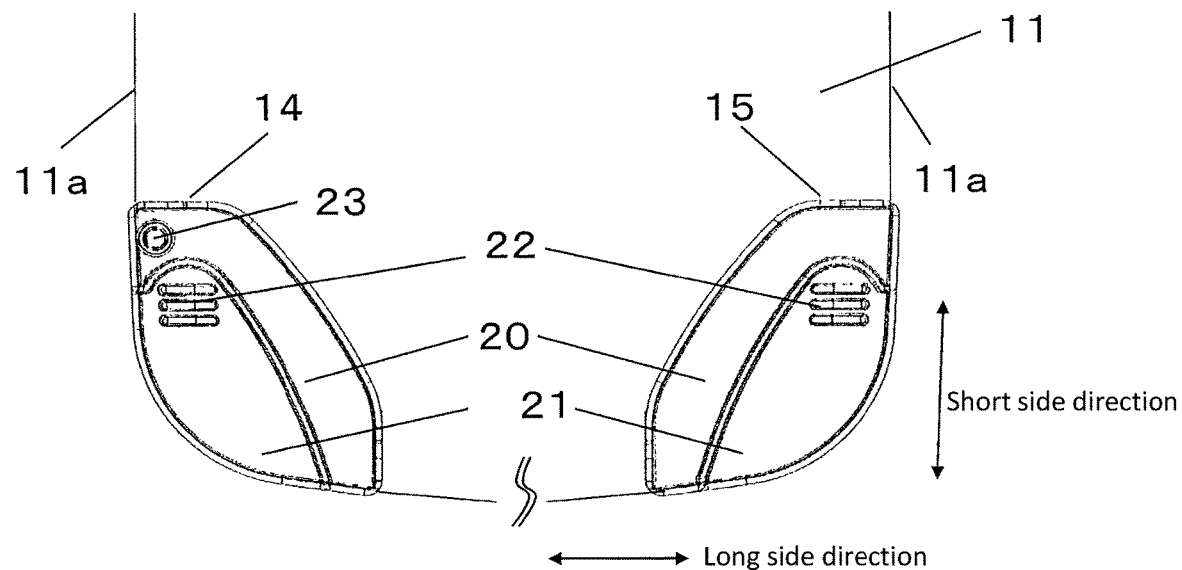
FIGS. 7A and 7B are plan views illustrating the handle member being attached to a sheet member.
Figure 7B:
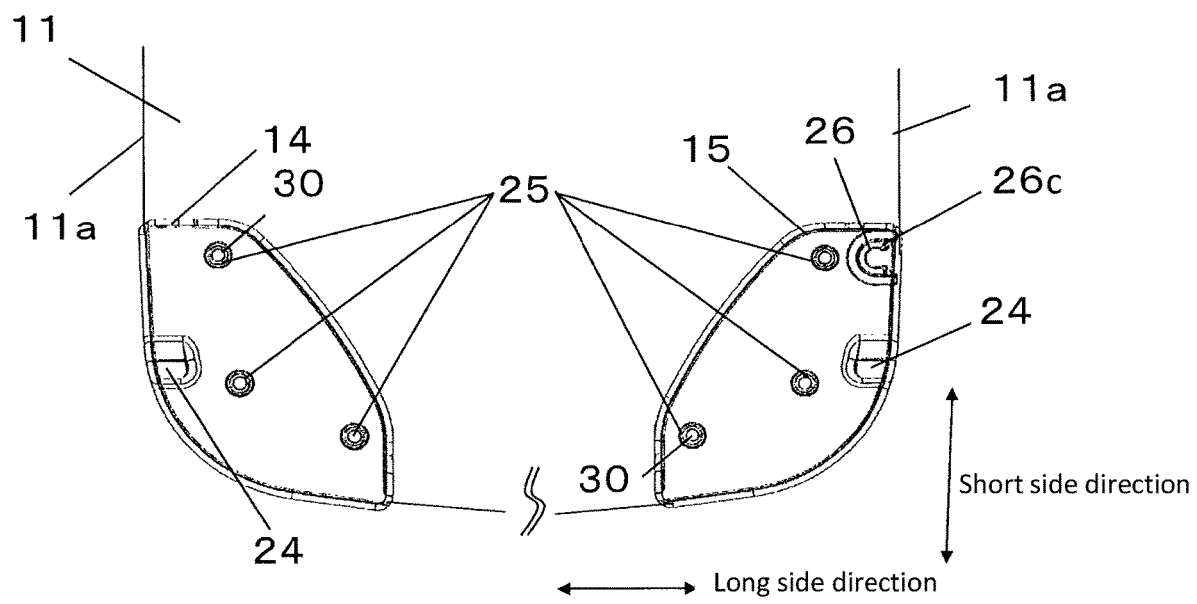

FIG. 4 to FIG. 7B are diagrams illustrating more detailed configurations of handle members 14 and 15. More specifically, FIG. 4 is a perspective view illustrating a front surface of handle member 14, FIG. 5 is a perspective view illustrating a back surface of handle member 14, and FIG. 6 is a perspective view illustrating handle member 15. FIGS. 7A and 7B are plan views illustrating handle members 14 and 15 being attached to sheet member 11. FIG. 7A illustrates handle members 14 and 15 as viewed from a front surface of tonneau cover 1, and FIG. 7B illustrates handle members 14 and 15 as viewed from a back surface of tonneau cover 1. The front surfaces of tonneau cover 1 and handle members 14 and 15 are surfaces directed to the upper sides when tonneau cover 1 is attached to automobile 100. The back surfaces are surfaces directed to the lower sides when tonneau cover 1 is attached to automobile 100.

As illustrated in FIG. 4 and FIG. 7A, general surface 20, and recessed part 21 that is a step part lower than general surface 20, are formed on the front surface of handle member 14. Herein, "lower" means being recessed toward the back surface from the front surface of handle member 14. Recessed part 21 indicates a position at which a predetermined finger (hereinafter, a thumb) is placed, when the user holds handle member 14. Protrusion part 22 that is a finger positioning part for determining a position of the thumb of the user, is provided in recessed part 21. Recessed part 21 and protrusion part 22 are desirably formed such that contact between the thumb and handle member 14 is limited in recessed part 21 in a case in which the user holds handle member 14 such that a tip of the thumb comes into contact with protrusion part 22. Protrusion part 22 is formed from three linear protrusions arranged in parallel, in the example illustrated in the drawing. However, the shape and the number of the protrusions that form protrusion part 22 are not limited to this example. Additionally, the finger positioning part is not limited to protrusion part 22, and the finger positioning part may be, for example, a dent part, combination of a protrusion part and a dent part, or the like.

Figure 8:
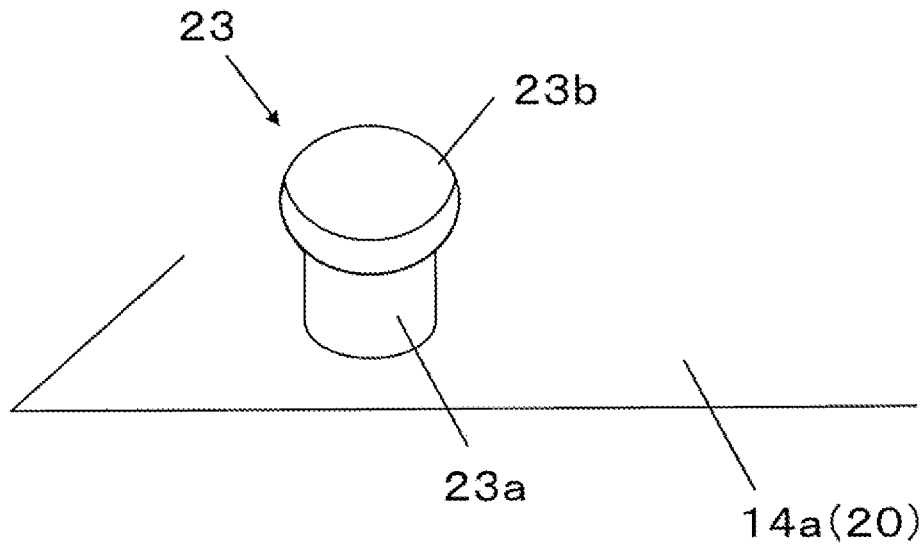
FIG. 8 is a perspective view illustrating a configuration example of a locking part.

Locking part 23, which is capable of locking to handle member 15 (more specifically, locking part 26 described below) when tonneau cover 1 is folded, is provided on the front surface of handle member 14. FIG. 8 is a perspective view illustrating a configuration example of locking part 23. Locking part 23 illustrated in FIG. 8 is a projection part that has columnar base 23a and head 23b. Base 23a extends from front surface 14a of handle member 14. Head 23b is formed at a tip of base 23a and has wider width (radius) than base 23a. A position at which locking part 23 is provided is not limited as long as locking part 23 can be locked to handle member 15 (locking part 26). However, locking part 23 is desirably formed in general surface 20 so as not to become a hindrance when the user holds handle member 14. It is preferable to form locking part 23 in the vicinity of short side 11a of sheet member 11 from the standpoint of ease of locking, as illustrated in FIG. 7A.

As illustrated in FIG. 5 and FIG. 7B, protrusion part 24 is provided on the back surface of handle member 14. Protrusion part 24 is a finger positioning part for determining a position at which a finger (hereinafter, a forefinger) that is different from the thumb of the user, is placed when the user holds tonneau cover 1. Protrusion part 24 is disposed on a back side of recessed part 21 such that the forefinger can be hooked on protrusion part 24 when the thumb is placed in recessed part 21 of the front surface of handle member 14. In the back surface of handle member 14, screw holes 25 through which screws 30 are inserted, are formed as engagement parts for attaching handle member 14 to sheet member 11. The number and the positions of screw holes 25 are not particularly limited. However, in the example illustrated in the drawing, the number of screw holes 25 is three and they are disposed at respective different positions.

As illustrated in FIGS. 4 to 7B, handle member 15 has a configuration of a substantial mirror image (right/left inversion) of handle member 14, but is different from handle member 14 in the following points. Namely, locking part 23 is formed on the front surface of handle member 14, but locking part is not formed on a front surface of handle member 15. Locking part is not formed on the back surface of handle member 14, but locking part 26 is formed on a back surface of handle member 15. Locking part 26 can be locked to locking part 23 of handle member 14, when tonneau cover 1 is folded.

Figure 9:
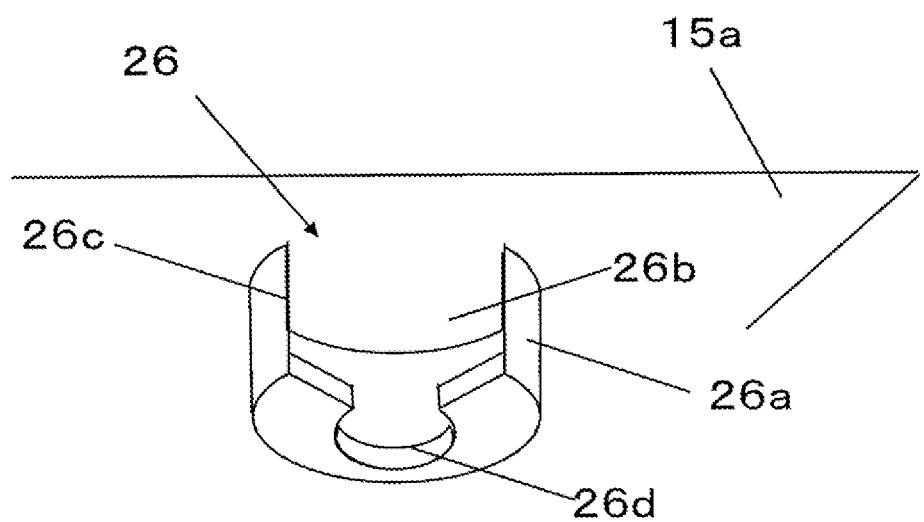
FIG. 9 is a perspective view illustrating another configuration example of a locking part.

FIG. 9 is a diagram illustrating a configuration example of locking part 26. Locking part 26 illustrated in FIG. 9 has pedestal part 26a that is a substantially cylindrical projection part extending from back surface 15a of handle member 15. Space 26b is provided in pedestal part 26a, and space 26b stores head 23b of locking part 23 therein when locking part 23 is locked to locking part 26. Inlet 26c connected to space 26b is formed in side surface of pedestal part 26a, and head 23b is inserted into space 26b through inlet 26c. Furthermore, opening 26d communicated with inlet 26c is provided in a top part of pedestal part 26a. Opening 26d is formed in a keyhole shape as viewed from back surface 15a of handle member 15, and is narrower than head 23b of locking part 23, and is wider than base 23a of locking part 23. Therefore, base 23a connected to head 23b can be out of space 26b from opening 26d in a state in which head 23b of locking part 23 is stored in space 26b. The position at which locking part 26 is provided is not limited as long as locking part 26 can be locked to locking part 23 of handle member 14. As illustrated in FIG. 7B, it is preferable to form locking part 26 in the vicinity of short side 11a of sheet member 11 from the standpoint of ease of locking. Inlet 26c is desirably directed toward short side 11a.

Figure 10:
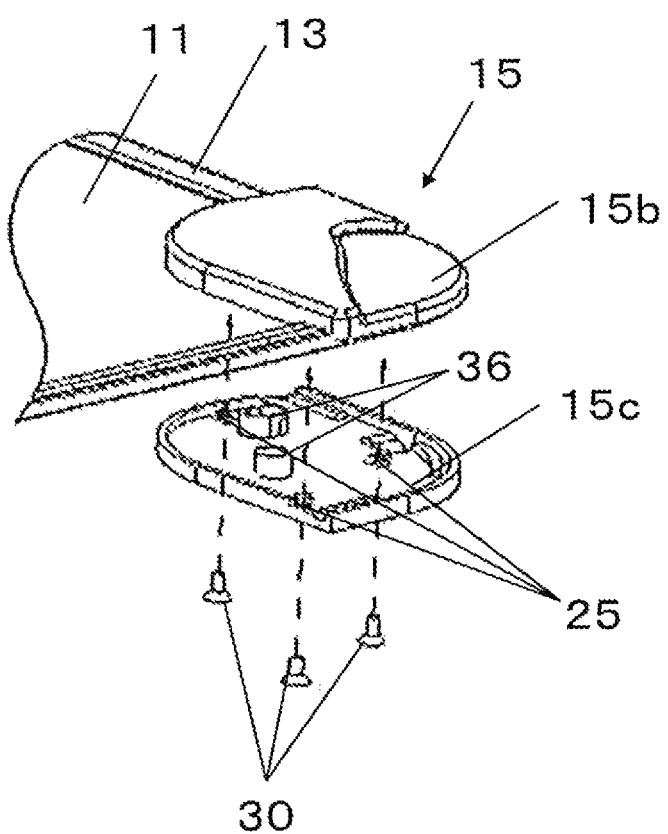
FIG. 10 is a diagram for illustrating an attachment method for attaching the handle member.
Figure 11A:
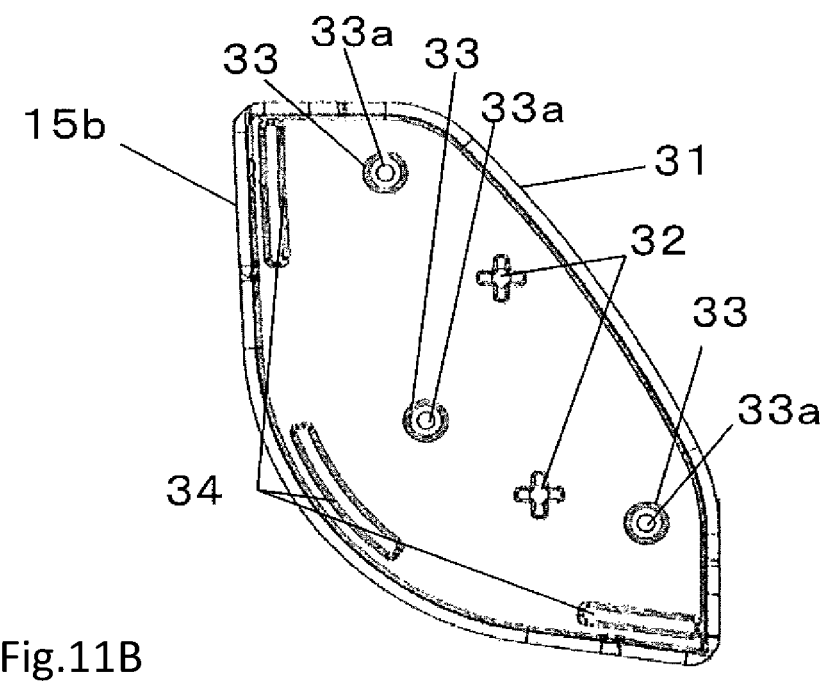
FIGS. 11A and 11B are plan views illustrating an example of a back surface of a half body.
Figure 11B:
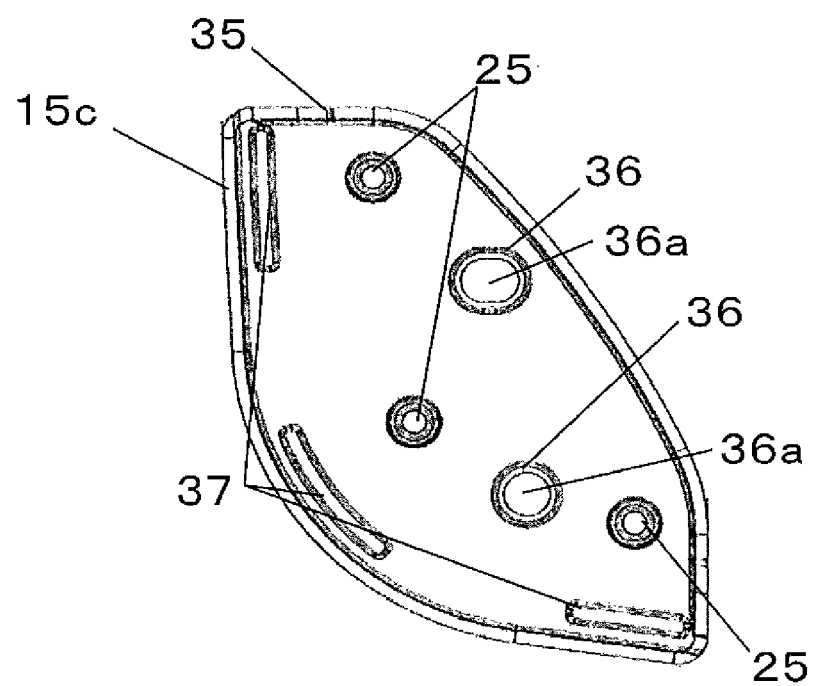

FIG. 10 and FIGS. 11A and 11B are diagrams for illustrating an attachment method for attaching handle members 14 and 15 to sheet member 11. The attachment methods of handle members 14 and 15 are the same, and therefore the attachment method of handle members 15 will be explained as an example, hereinafter.

As illustrated in FIG. 10, handle member 15 is composed of half bodies 15b and 15c that are a pair (two) of engagement members capable of engaging with each other. Half bodies 15b and 15c engage with each other with sheet member 11 sandwiched therebetween, so that handle member 15 is attached to sheet member 11. Half body 15b has the front surface of handle member 15, and is disposed on the upper side of sheet member 11 when tonneau cover 1 is attached to automobile 100. Half body 15c has the back surface of handle member 15, and is disposed on the lower side of sheet member 11 when tonneau cover 1 is attached to automobile 100.

FIG. 11A illustrates the back surface of half body 15b, and FIG. 11B illustrates the back surface of half body 15c. The back surfaces of half bodies 15b and 15c are surfaces that face sheet member 11 when handle member 15 is attached to sheet member 11.

As illustrated in FIG. 11A, wall part 31, projection parts 32 and engagement parts 33 are formed in the back surface of half body 15b. Wall part 31 surrounds an outer peripheral part of half body 15b. Projection parts 32 are engagement positioning parts for determining respective positions of half body 15b and half body 15c when half body 15b engages with half body 15c. Engagement parts 33 engages with half body 15c. In the example illustrated in the drawing, the number of projection parts 32 are two. Each projection part 32 is formed in a cruciform, and they are disposed at different positions. Engagement parts 33 are projection parts having screw holes 33a, into which screws 30 are inserted, at top parts. In the example illustrated in the drawing, the number of engagement parts 33 is three, and they are disposed at respective different positions. Grooves (not illustrated) fitted to screws 30 are formed inside screw holes 33a. Screw holes 33a do not penetrate from the back surface to the front surface, and therefore screw holes are not formed in a front surface of half body 15b (front surface of handle part 15).

Linear projection parts 34 extending along the outer peripheral part of half body 15b are formed in the back surface of half body 15b. Projection parts 34 are disposed such that wire 12 is sandwiched between projection parts 34 and wall part 31 when half bodies 15b and 15c engages with each other with sheet member 11 sandwiched therebetween. In the example illustrated in the drawing, the number of projection parts 34 is three, and they are disposed along wall part 31.

On the other hand, as illustrated in FIG. 11B, wall part 35, projection parts 36 and screw holes 25 are formed in the back surface of half body 15c. Wall part 35 surrounds an outer peripheral part of half body 15c. Projection parts 36 are engagement positioning parts for determining respective positions of half body 15c and half body 15b when half body 15c engages with half body 15b. Projection parts 36 have circular or oval holes 36a at a top part. In the example illustrated in the drawing, the number of projection parts 36 is two, projection parts 36 are disposed and formed such that projection parts 32 of half body 15b are inserted into holes 36a of projection parts 36 when half body 15c engages with half body 15b. Linear projection parts 37 extending along the outer peripheral part of half body 15b are formed on the back surface of half body 15c. Projection parts 37 are disposed such that wire 12 is sandwiched between projection parts 37 and wall part 35 when half bodies 15b and 15b engages with each other with sheet member 11 sandwiched therebetween. In the example illustrated in the drawing, the number of projection parts 37 is three, and they are disposed along wall part 35.

When handle member 15 is attached to sheet member 11, for example, as illustrated in FIG. 10, half body 15b of handle member 15 is first placed on a corner part of sheet member 11, and thereafter half body 15c faces half body 15b. At this time, holes 36a of projection parts 36 formed in back surface of half body 15c, and projection parts 32 formed in the back surface of half body 15b face each other with sheet member 11 sandwiched therebetween. Then, screws 30 are inserted from screw holes 25 formed in half body 15b up to screw holes 33a of engagement parts 33 provided in the back surface of half body 15b, so that screws 30 and screw holes 33a are fitted. Consequently, half bodies 15b and 15c are engaged with each other with sheet member 11 sandwiched therebetween, and handle member 15 is attached to sheet member 11. Preferably, holes through which screws 30 or projection parts 32 passes, are previously opened in sheet member 11.

Figure 12A:
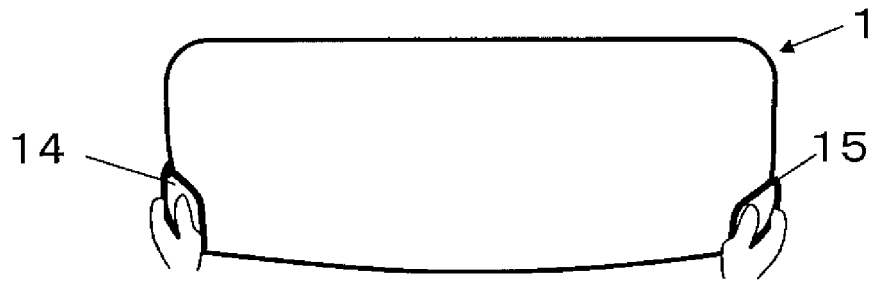
FIGS. 12A to 12D are diagrams for illustrating operation of folding the tonneau cover.
Figure 12B:
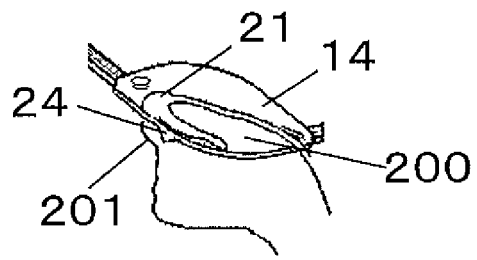

FIG. 12A to FIG. 14C are diagrams which illustrate an operation of folding tonneau cover 1. In a case in which the tonneau cover is folded, a user first holds handle members 14 and 15 of tonneau cover 1 with his/her hands, as illustrated in FIG. 12A. At this time, as illustrated in FIG. 12B, thumbs 200 are placed on recessed parts 21 of handle members 14 and 15, and the user hooks forefingers 201 to protrusion part 24. Thereafter, as illustrated in FIG. 12C, the user moves his/her hands in such directions that handle members 14 and 15 come close to each other, similarly to shutting a book.

Figure 12C:
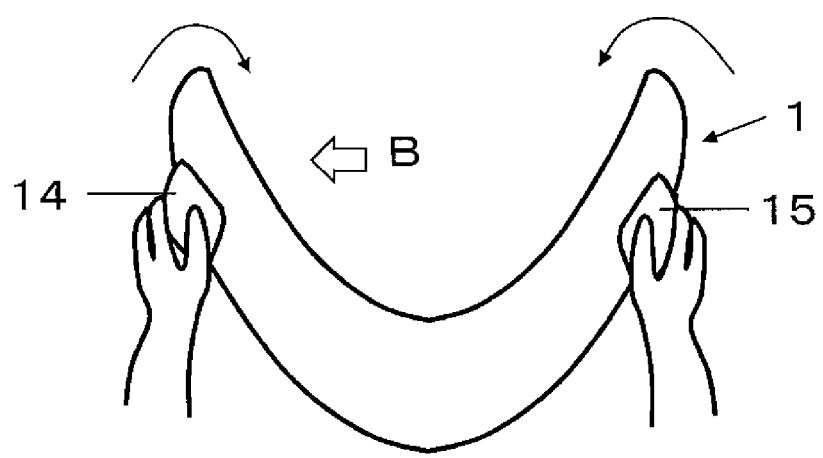
Figure 12D:
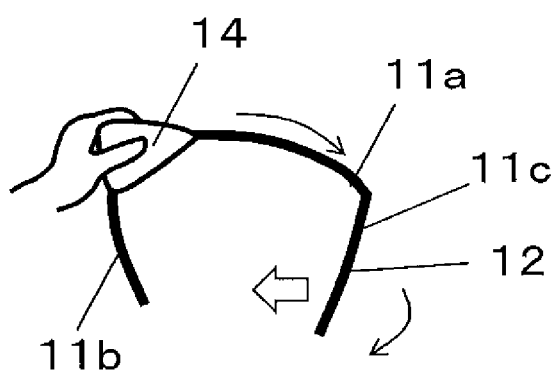

FIG. 12D is a side view of tonneau cover 1 as viewed from the direction B of FIG. 12C. When the user moves his/her hands in the directions in which handle members 14 and 15 come close to each other as illustrated in FIG. 12C wire 12 attached to long side 11c naturally warps as illustrated in FIG. 12D. Long side 11c faces long side 11b to which handle members 14 and 15 is attached in sheet member 11. Furthermore, wire 12 attached to short side 11a of sheet member 11 also naturally warps. Long side 11c is drawn to the inside of sheet member 11 (toward long side 11b) as illustrated by the arrows in FIG. 12D. At this time, power is applied so as to draw wire 12 attached to long side 11b to the inside of sheet member 11 (toward long side 11c). However, long side 11b is held by the user, and therefore wire 12 attached to long side 11b does not move. Therefore, when the user brings handle members 14 and 15 close to each other, long side 11c is drawn toward long side 11b, and long side 11c is further drawn toward the user compared to long side 11b, as illustrated in FIG. 13A.

Figure 13A:
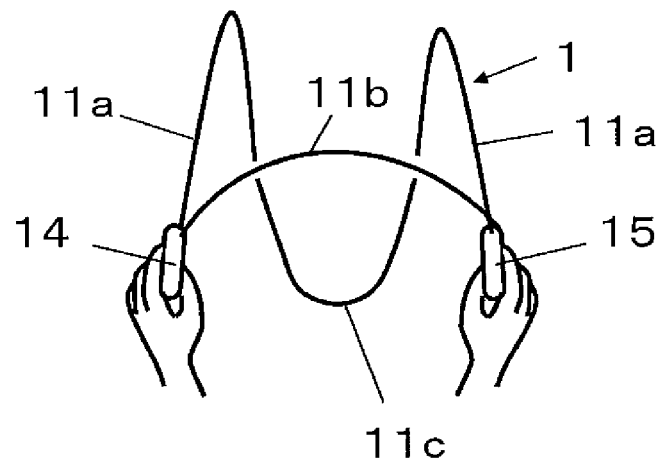
FIGS. 13A to 13C are diagrams for illustrating operation of folding the tonneau cover.
Figure 13B:
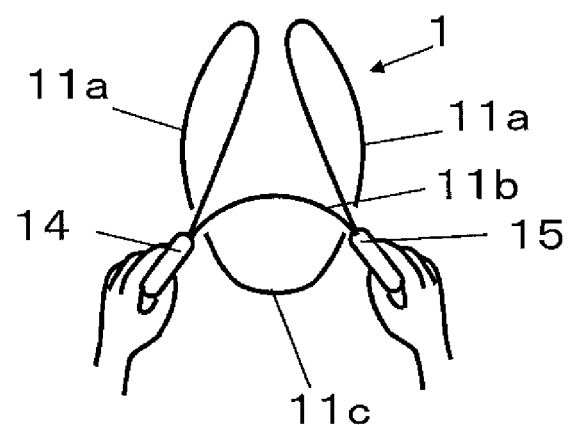

Thereafter, the user moves his/her hands similarly to shutting a book, from the position illustrated in FIG. 13A. That is, the user brings his/her hands close to each other while turning over his/her palms such that the backs of his/her hands are directec upward. Consequently, tonneau cover 1 is folded as illustrated in FIG. 13B.

Figure 13C:
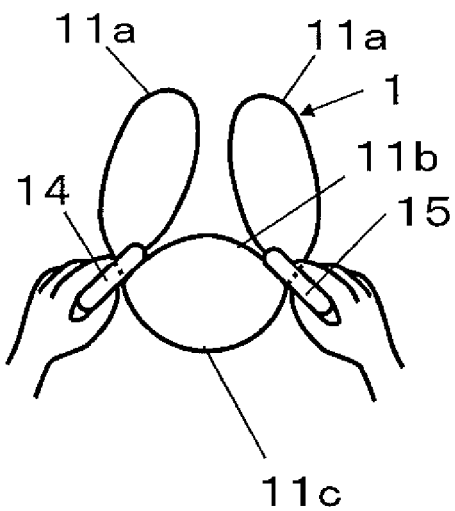

When the user further moves his/her hands from this position in a similar manner, tonneau cover 1 forms three circles as illustrated in FIG. 13C.

Figure 14A:
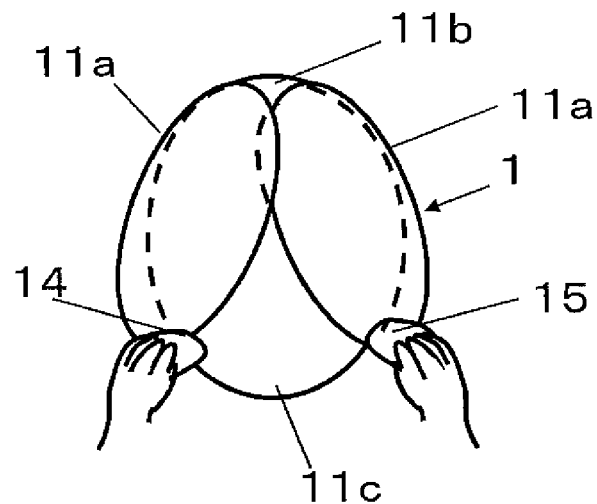
FIGS. 14A to 14C are diagrams for illustrating operation of folding the tonneau cover.
Figure 14B:
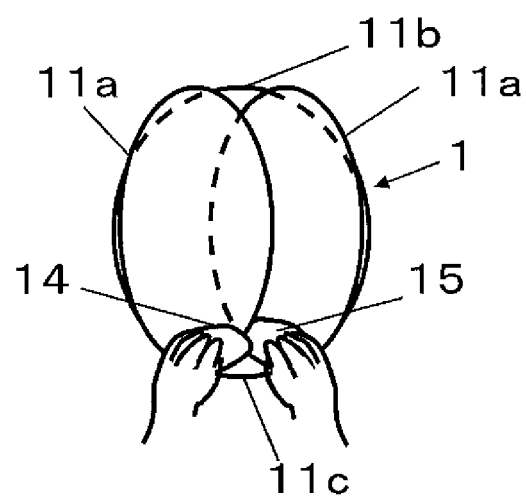
Figure 14C:
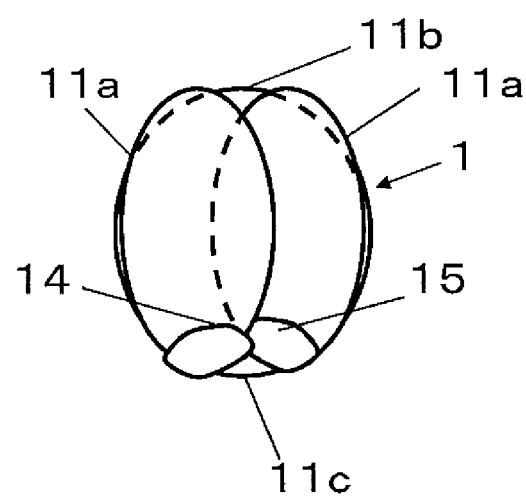

Then, when the user turns the direction of his/her palms by 180 degrees, and moves his/her hands until the backs of his/her hand are directed upward, tonneau cover 1 is folded so as to overlap three circles as illustrated in FIG. 14A. In this state, the user locks locking parts 23 and 26 formed in handle members 14 and 15 respectively, as illustrated in FIG. 14B. Consequently, as illustrated in FIG. 14C, even when the user removes his/her hands from tonneau cover 1, it is possible to prevent tonneau cover 1 from returning to its original state.

Figure 15A:
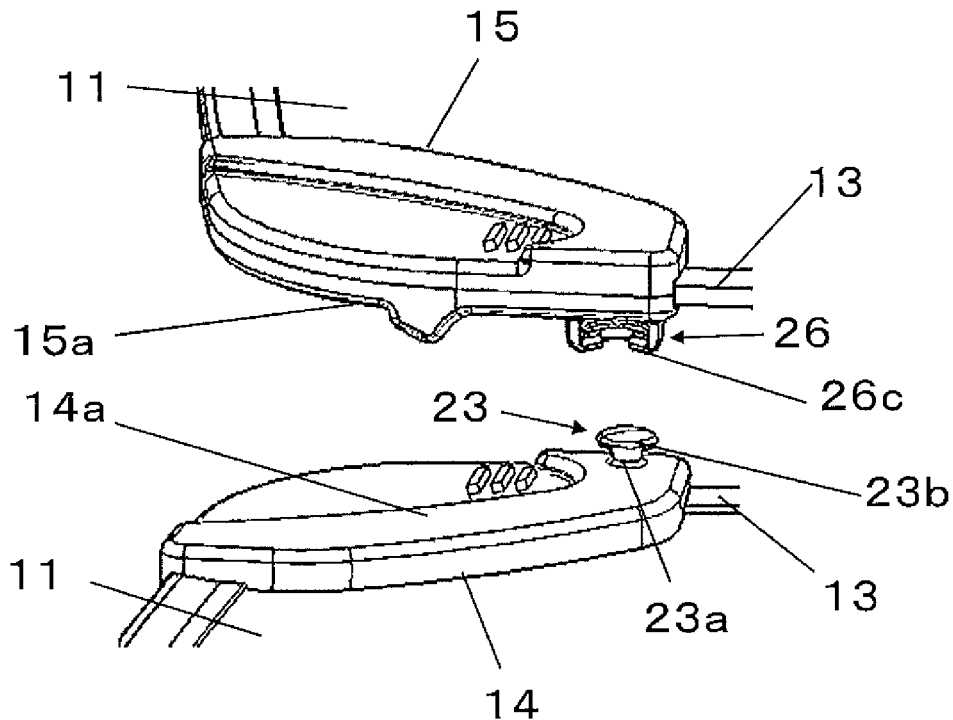
FIGS. 15A to 15B are diagrams for illustrating a locking method of the tonneau cover by the locking part.
Figure 15B:
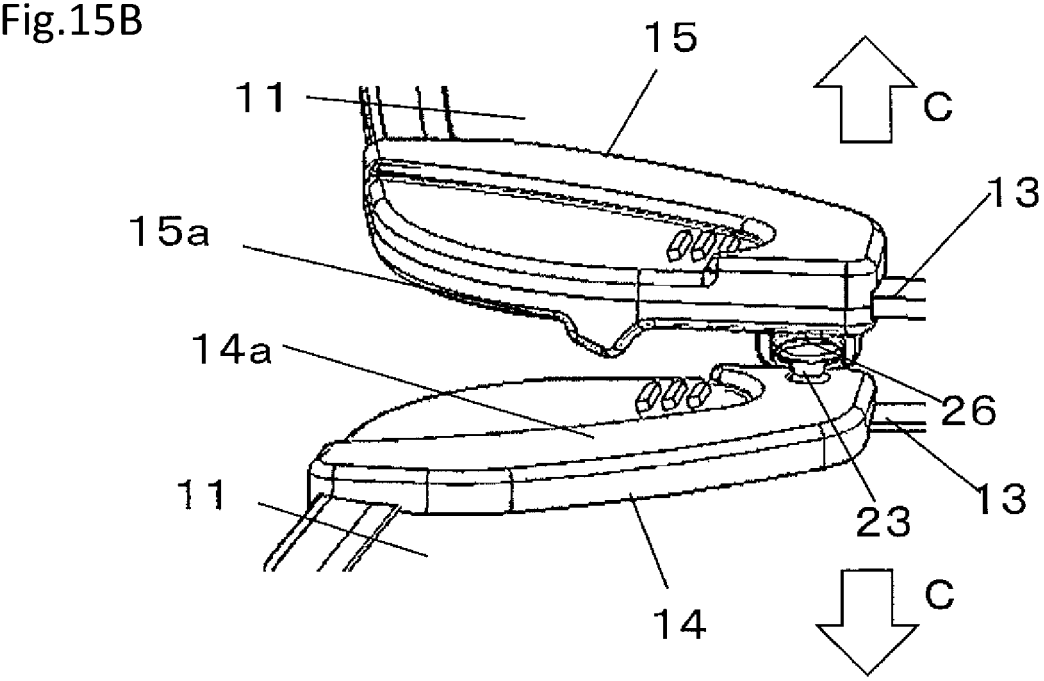

FIGS. 15A and 15B are diagrams for illustrating a locking method of tonneau cover 1 by locking parts 23 and 26. When the user folds tonneau cover 1 as illustrated in FIG. 13C, front surface 14a of handle member 14 and back surface 15a of handle member 15 face each other as illustrated in FIG. 15A. Therefore, locking parts 23 and 26 face each other.

In the state illustrated in FIG. 15A, head 23b of locking part 23 illustrated in FIG. 9 enters space 26b from inlet 26c of locking part 26 illustrated in FIG. 10 by laterally sliding operation. Consequently, head 23b is stored in space 26b, base 23a connected to head 23b extends from opening 26d of locking part 26 to the outside of space 26b. Consequently, as illustrated in FIG. 15B, locking parts 23 and 26 lock to each other. At this time, power is applied to tonneau cover 1 in such a direction as to release a folding state by elasticity of wire 12, that is, in the direction illustrated by the arrows C in FIG. 15B (vertical direction). However, the width of opening 26d of locking part 26 is narrower than the width of head 23b of locking part 23, and therefore head 23b cannot pass through opening 26d, and the locked state of locking parts 23 and 26 are not released. Therefore, power in the vertical direction, that is, in such a direction that the tonneau cover is opened, is reduced, and it is possible to prevent release of folding state at unexpected timing.

Thus, in this embodiment, handle members 14 and 15 fixed to wire 12 are provided, and therefore tonneau cover 1 can be folded by simply holding handle parts 14 and 15 and moving tonneau cover 1 similarly to shutting a book. Therefore, when tonneau cover 1 is folded, it is easy to find a place for holding tonneau cover 1, and operation of twisting tonneau cover 1 is not needed, and therefore tonneau cover 1 can be easily folded. Recessed parts 21 and protrusion part 22, 24 specifying the positions at which fingers are placed, are provided in handle members 14 and 15. Therefore, it is easy to understand how to hold handle members 14 and 15. Therefore, tonneau cover 1 can be more easily folded. Handle members 14 and 15 have an advantage that high class feeling can be given to tonneau cover 1.

Figure 16:
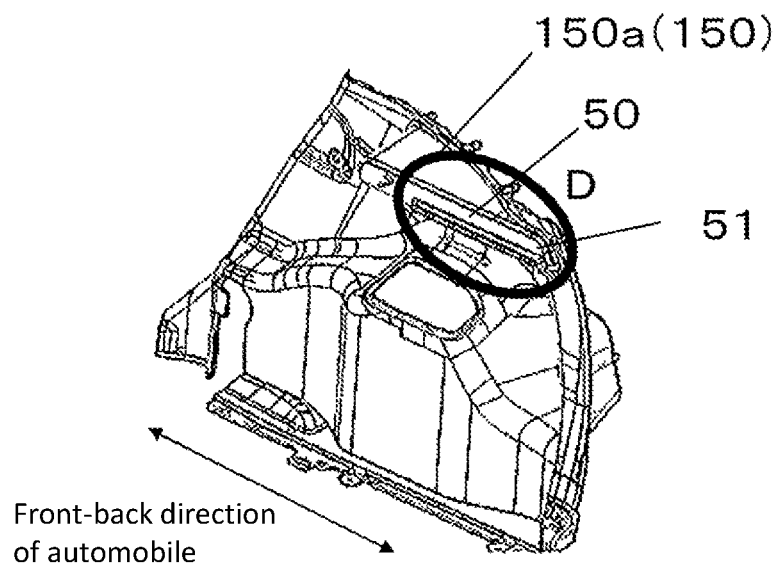
FIG. 16 is a perspective view illustrating an example of a side wall of the automobile.
Figure 17:
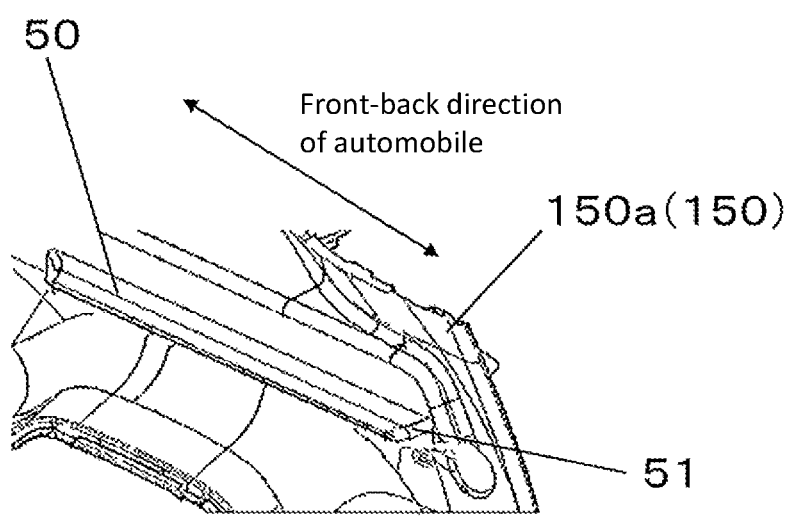
FIG. 17 is an enlarged view of region D of FIG. 16.

Now, a light-blocking structure having tonneau cover 1 and an attachment mechanism for attaching tonneau cover 1 to automobile 100 will be described. FIG. 16 is a perspective view schematically illustrating one side wall 150a of two side walls 150 that partition luggage compartment 120 of automobile 100. FIG. 17 is an enlarged view of region D in FIG. 16. As illustrated in FIGS. 16 and 17, side wall 150a has shelf part 50 for attaching tonneau cover 1. Shelf part 50 substantially horizontally extends along the vehicle longitudinal direction. The length and the width of shelf part 50 are not particularly limited. However, it is preferable to form shelf part 50 such that the tonneau cover does not fall from shelf part 50 due to swing of automobile 100 or the like when tonneau cover 1 is placed on shelf part 50. Shelf part 50 is formed of a single continuous shelf in the example illustrated in the drawing, but may be formed of a plurality of shelfs independent of each other. Although the other of two side walls 150 is not illustrated, the other side wall has a configuration of a mirror image inversion of side wall 150a illustrated in FIG. 16.

Figure 18:
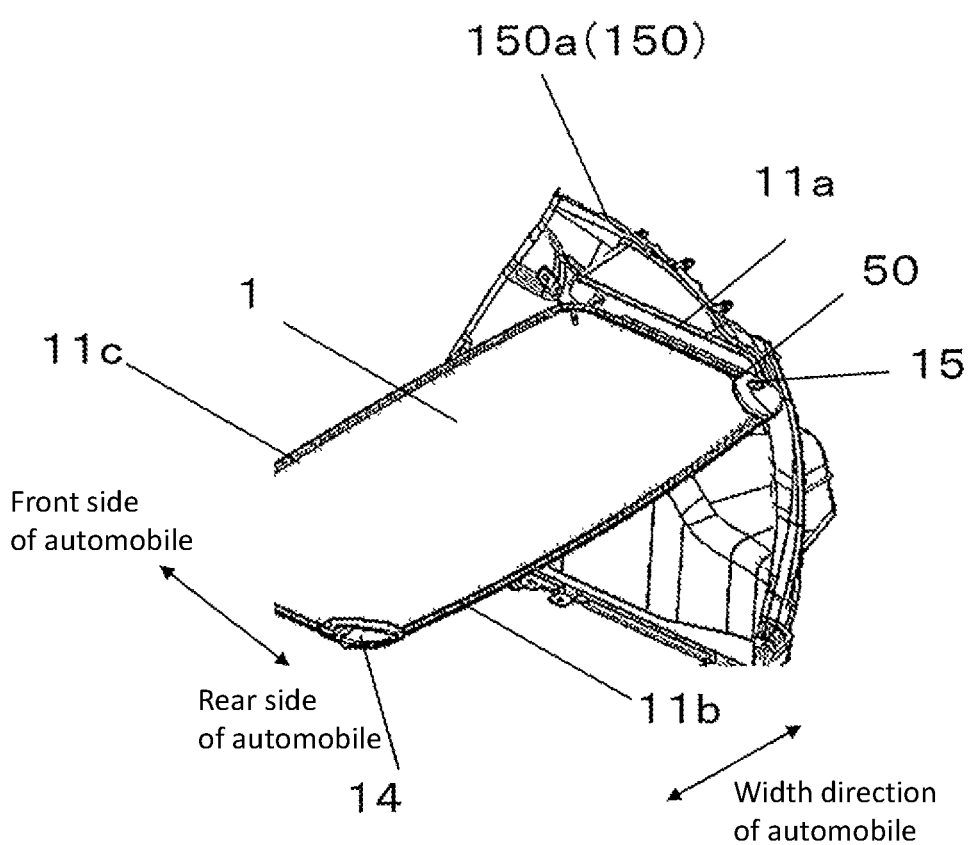
FIG. 18 is a perspective view illustrating the tonneau cover being placed on a shelf part.

FIG. 18 is a perspective view illustrating tonneau cover 1 being attached to shelf part 50. Short sides 11a of sheet member 11 are placed on respective shelf parts 50 of both side walls 150, so that tonneau cover 1 is installed from one side wall 150a to the other side wall. At this time, tonneau cover 1 is installed such that long side 11b provided with handle members 14 and 15 among two long sides 11b and 11c of sheet member 11 are disposed on the vehicle rear side.

Figure 19:
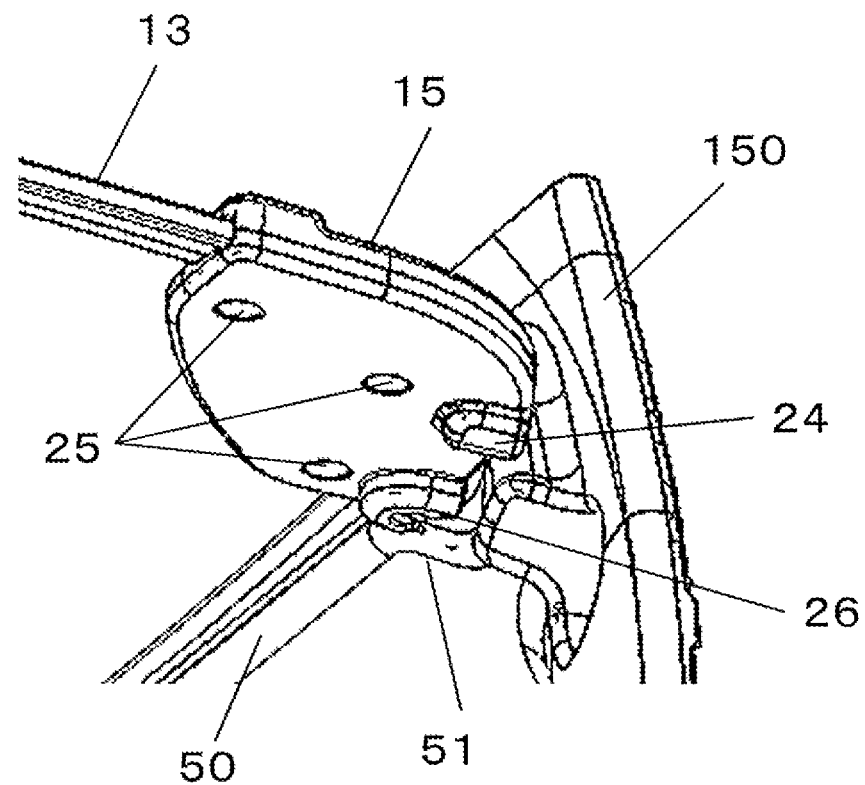
FIG. 19 is a perspective view of the vicinity of the handle member of the tonneau cover being placed on the shelf part, the handle member being viewed from a lower side.
Figure 20:
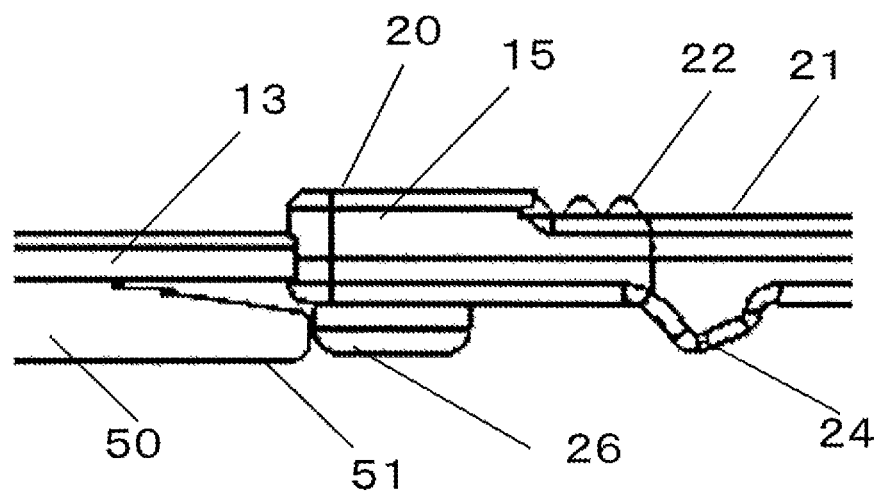
FIG. 20 is a plan view of the vicinity of the handle member of the tonneau cover being placed on the shelf part, the handle member being viewed from the horizontal direction.

FIG. 19 is a perspective view of the vicinity of handle member 15 of tonneau cover 1 placed on shelf part 50 as viewed from a lower side. FIG. 20 is a plan view of the vicinity of handle member 15 of tonneau cover 1 placed on shelf part 50 as viewed from the vehicle width direction.

As illustrated in FIG. 19 and FIG. 20, locking part 26 formed in the back surface of handle member 15 is used also as a shelf positioning part for determining a position for tonneau cover 1 on shelf part 50 by contact with one end (the vehicle rear end in this embodiment) 51 of shelf part 50. Consequently, a member that is developed exclusively for shelf positioning part does not need to be provided in tonneau cover 1, and therefore it is possible to simplify a structure of tonneau cover 1.

Second Embodiment

In this embodiment, another forms of handle members 14 and 15 will be described.

Figure 21A:
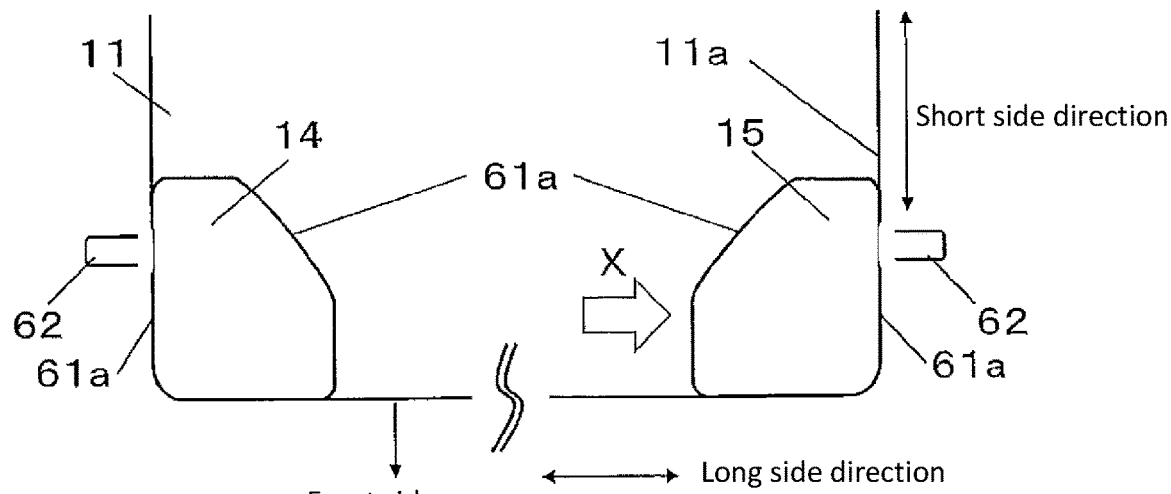
FIGS. 21A and 21B are plan views illustrating a handle member being attached to a sheet member.
Figure 21B:
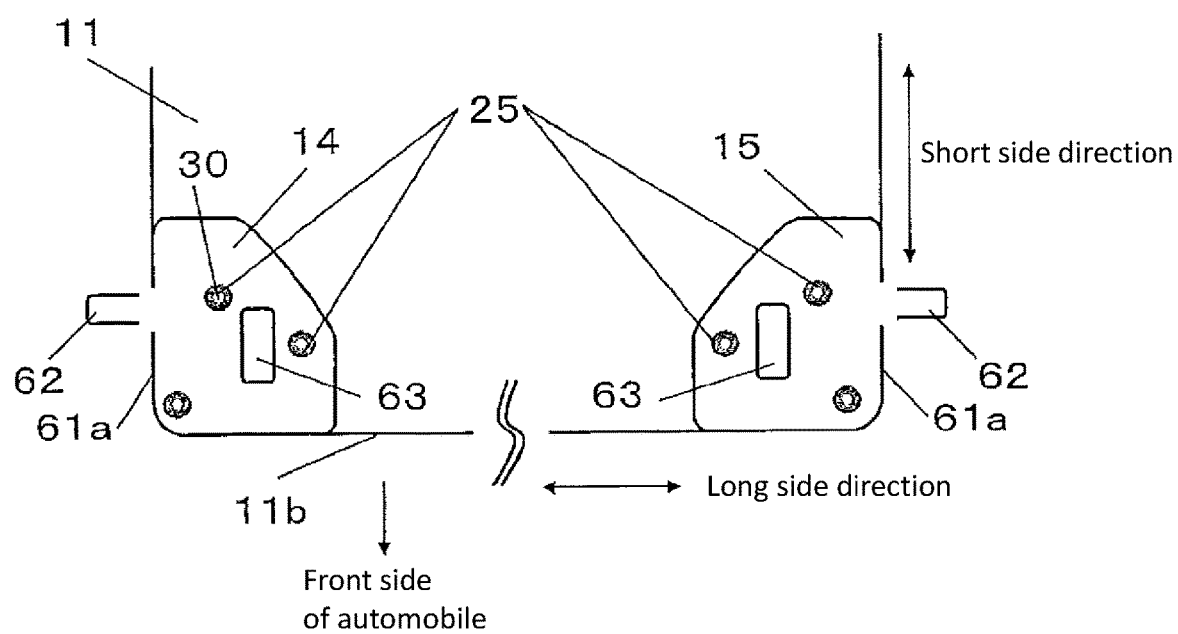
Figure 22:
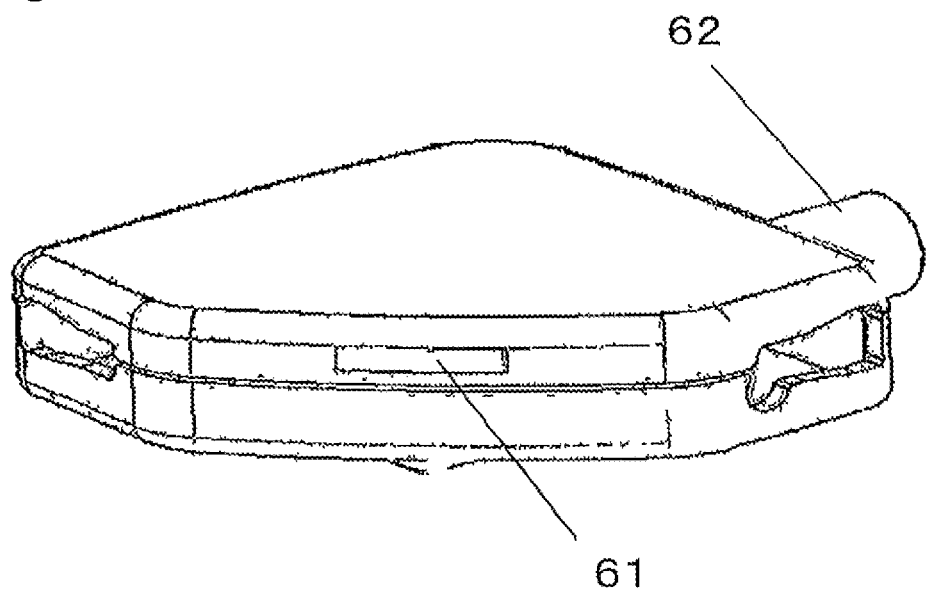
FIG. 22 is a perspective view illustrating a front surface of one handle member.
Figure 23:
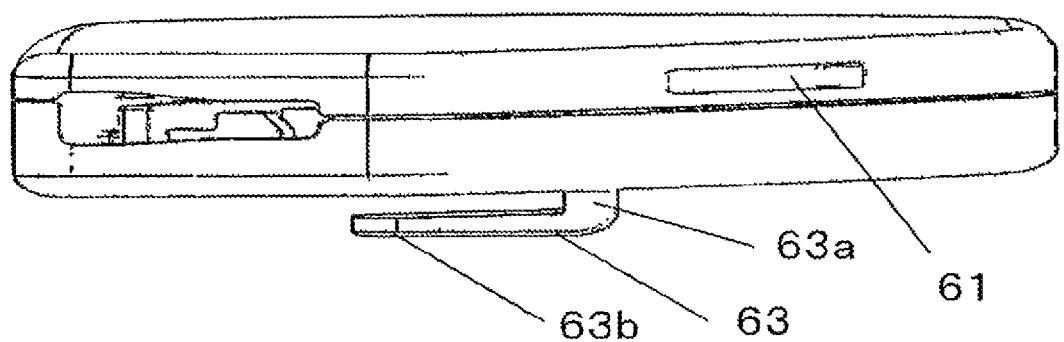
FIG. 23 is a perspective view illustrating a side surface of the one handle member.

FIG. 21A to FIG. 23 are diagrams illustrating configurations of handle members 14 and 15 of a second embodiment of the present invention. More specifically, FIGS. 21A and 21B are plan views illustrating handle members 14 and 15 being attached to sheet member 11. FIG. 21A illustrates handle members 14 and 15 as viewed from a front surface of tonneau cover 1, and FIG. 21B illustrates handle members 14 and 15 as viewed from a back surface of tonneau cover 1. FIG. 22 is a perspective view illustrating a front surface of handle member 14. FIG. 23 is a perspective view illustrating a side surface of handle member 14. In this embodiment, handle member 15 has a configuration in which handle member 14 is mirror-inverted, and therefore description of handle member 15 will be omitted appropriately.

As illustrated in FIG. 21A to FIG. 23, the front surface of handle member 14 is formed of a planar surface. Locking groove 61 and protrusion part 62 are provided in the side surface of handle member 14. Locking groove 61 is a locking part which is locked to handle member 15 (more specifically, hooked protrusion part 63 described below). Protrusion part 62 is used for installing tonneau cover 1 in luggage compartment 120 of automobile 100.

Locking groove 61 is a recessed part or a hole into which hooked protrusion part 63 is inserted so that hooked protrusion part 63 is locked to looking groove 61, when tonneau cover 1 is folded. In the example illustrated in the drawing, locking groove 61 is provided in side surface 61a of handle member 14 facing a corner part of sheet member 11 provided with handle member 14.

Protrusion part 62 extends toward the outside of sheet member 11 along the longitudinal direction from side surface 61b. Side surface 61b extends along the short side of sheet member 11 in handle member 14. In this embodiment, protrusion part 62 has a columnar shape, but may have another shape such as a prismatic shape.

Respective protrusion parts 62 provided in handle members 14 and 15 are placed at predetermined positions of shelf parts 50 provided in side walls 150a of luggage compartment 120 of automobile 100, so that tonneau cover 1 is installed in luggage compartment 120 of automobile 100. Recessed parts (not illustrated) for placing protrusion parts 62 or the like may be provided at the predetermined positions of shelf part 50. In the first embodiment, tonneau cover 1 is installed such that long side 11b provided with handle members 14 and 15 in sheet member 11 is disposed on the vehicle rear side. However, in this embodiment, tonneau cover 1 is installed such that long side 11b in sheet member 11 is disposed on the vehicle front side.

In the back surface of handle member 15, screw holes 25 through which screws 30 are inserted, and hooked protrusion part 63 that is a locking part are formed. In the example illustrated in the drawing, the number of screw holes 25 is three similarly to the first embodiment, and they are disposed at respective different positions.

Figure 24:
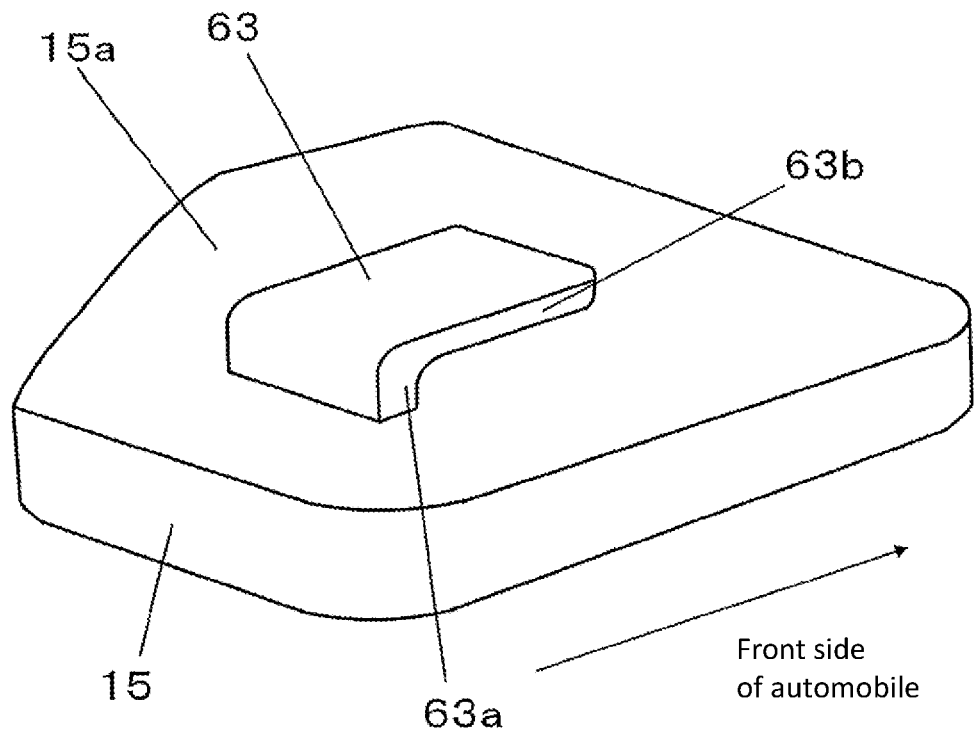
FIG. 24 is a perspective view illustrating a more detailed configuration of a hooked protrusion part.

FIG. 24 is a perspective view illustrating a more detailed configuration of hooked protrusion part 63. As illustrated in FIG. 24, hooked protrusion part 63 has a substantially L-shape, and is connected to back surface 15a of handle member 15. Hooked protrusion part 63 has base 63a and head 63b. Base 63a extends from back surface 15a. Head 63b is connected to a tip of base 63a and extends in the direction along back surface 15a (sheet member 11).

Figure 25:
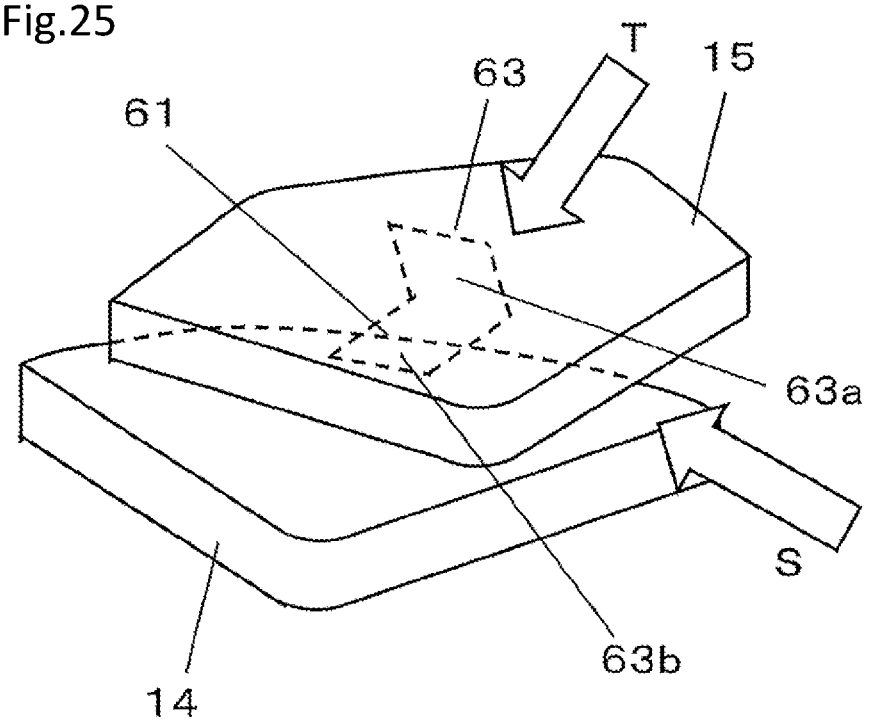
FIG. 25 is a diagram for illustrating a locking method of a tonneau cover by a locking groove and the hooked protrusion part.

FIG. 25 is a diagram for illustrating a locking method of the tonneau cover by locking groove 61 and hooked protrusion part 63. When a user folds tonneau cover 1 as illustrated in FIG. 13C, head 63b of hooked protrusion part 62 in handle member 15, and locking groove 61 in handle member 14 face each other. In this state, head 63b of hooked protrusion part 62 in handle member 15 is inserted into locking groove 61 in handle member 14 as illustrated in FIG. 25, so that head 63b can be locked to locking groove 61 of handle member 14. At this time, closing direction S and insertion direction T are substantially perpendicular to each other. Closing direction S is the direction in which tonneau cover 1 is folded to bring handle members 14 and 15 close to each other. Insertion direction T is the direction in which hooked protrusion part 62 is inserted into locking groove 61. Therefore, the locked state of locking groove 61 and hooked protrusion part 62 is unlikely to be released.

The shape of hooked protrusion part 63 is not limited to the shape illustrated in FIG. 24. FIGS. 26A and 26B and FIGS. 27A and 27B each are a diagram illustrating another shape of hooked protrusion part 63.

Figure 26A:
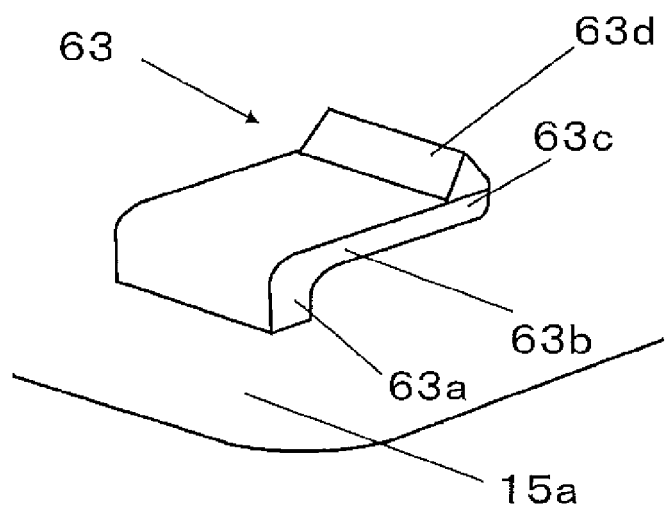
FIGS. 26A and 26B are diagrams illustrating another shape of the hooked protrusion part.
Figure 26B:
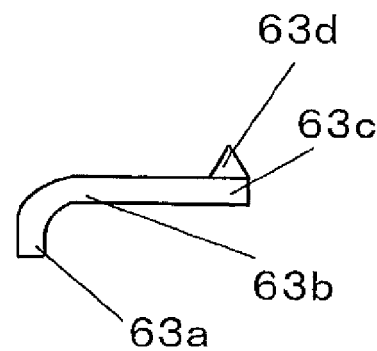

FIG. 26A is a perspective view of another example of hooked protrusion part 63, and FIG. 26B is a side view of another example of hooked protrusion part 63. In the example illustrated in FIG. 25, projection part 63d which extends in the direction substantially perpendicular to back surface 15a, is provided in tip 63c of head 63b of hooked protrusion part 63. Projection part 63d is provided along tip 63.

In this example, when head 63b of hooked protrusion part 62 is inserted into locking groove 61, projection part 63d presses against an inner wall (not illustrated) of locking groove 61 in the vertical direction (direction substantially perpendicular to back surface 15a), so that it is possible to more strongly lock hooked protrusion part 62 to locking groove 61.

Figure 27A:
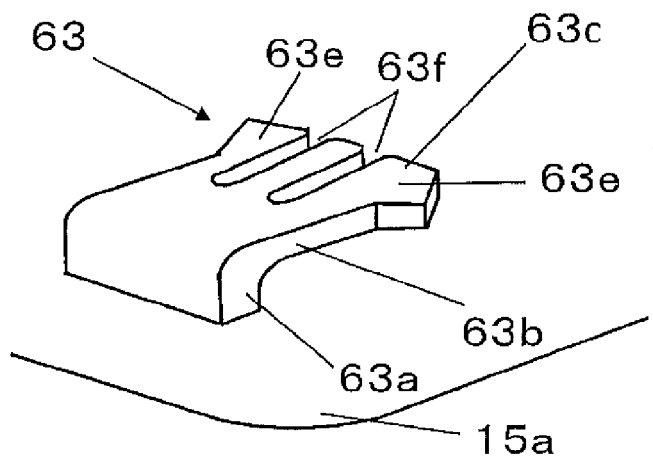
FIGS. 27A and 27B are diagrams illustrating another shape of the hooked protrusion part.
Figure 27B:
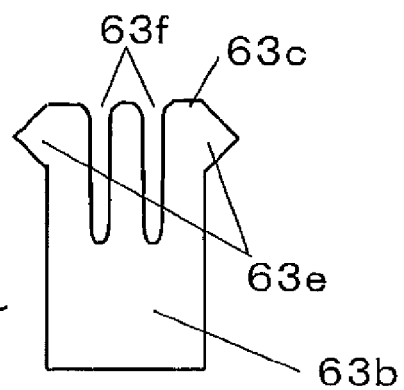

FIG. 27A is a perspective view of another example of hooked protrusion part 63, and FIG. 27B is a plan view of another example of hooked protrusion part 63. In the example illustrated in FIGS. 27A and 27B, projection parts 63e are provided and extends from both ends of tip 63c of head 63b of hooked protrusion part 63 in the direction along back surface 15a.

In this example, when head 63b of hooked protrusion part 62 is inserted into locking groove 61, projection part 63d presses against an inner wall of locking groove 61 in the horizontal direction (direction along back surface 15a), so that it is possible to more strongly lock hooked protrusion part 62 to locking groove 61.

Cutout parts 63f may be provided in tip 63c of head 63b of hooked protrusion part 63, as illustrated in FIGS. 27a and 27B. Consequently, head 63b of hooked protrusion part 62 can be easily warped, and therefore head 63b of hooked protrusion part 62 can be easily inserted into locking groove 61. Two cutout parts 63f are formed in the example illustrated in the drawing, but only one cutout part may be formed, or three or more cutout parts may be formed. Cutout parts 63f may be provided in hooked protrusion part 63 illustrated in FIG. 24 or FIGS. 26A and 26B.

Hooked protrusion part 62 may have both projection parts 63d and 63e. In this case, projection part 63d presses against an inner wall of locking groove 61 in both the vertical direction and the horizontal direction, so that it is possible to more strongly lock hooked protrusion part 62 to locking groove 61. It is possible to reduce or prevent backlash between hooked protrusion part 62 and locking groove 61. As a result, when tonneau cover 1 is mounted on a vehicle in its folded state, it is possible to reduce or prevent abnormal noise generated by vibration of the vehicle.

In this embodiment, locking grooves 61 are provided in the side surfaces of handle members 14 and 15. However, as long as locking grooves 61 can lock to hooked protrusion parts 63, locking grooves 61 may be provided at any positions such as front surfaces other than the side surfaces. However, from a standpoint of good appearance, locking grooves 61 are desirably provided in the side surfaces of handle members 14 and 15.

In this embodiment, both locking grooves 61 and hooked protrusion parts 63 are provided in handle members 14 and 15. However, locking groove 61 may be provided in one of handle members 14 and 15, and hooked protrusion part 63 may be provided in the other handle member.

In the embodiments described above, the illustrated configurations are each merely an example, and the present invention is not limited to the configurations.

For example, tonneau cover 1 is described as an example of the light-blocking member. However, the light-blocking member is not limited to tonneau cover 1, and the present invention can be applied to a general light-blocking member.

The locking mechanisms for locking tonneau cover 1 in its folded state are not limited to the examples illustrated in FIG. 8 and FIG. 9, and can be appropriately changed. For example, the locking mechanisms only need to be provided on a first surface side of sheet member 11 in one of handle members 14 and 15, and on a second surface side which is located on the back side of the first surface of sheet member 11 in the other of handle members 14 and 15, and have locking parts for locking to each other. Therefore, locking part 26 may be provided in the front surface of handle part 14, and locking part 23 may be provided in the back surface of handle part 15.

The locking mechanism may have a structure in which a string with a button is sewed in the vicinity of each of handle members 14 and 15 and in which handle members 14 and 15 are fixed by attaching their buttons to each other when tonneau cover 1 is folded. In this case, a configuration in which hanging-down of the strings can be normally reduced or prevented by fixing the buttons to handle members 14 and 15, may be employed.

REFERENCE NUMERALS 1 tonneau cover
11 sheet member
12 wire
13 edging member
14, 15 handle member
20 general surface
21 recessed part
22, 24 protrusion part
23, 26 locking part
25 screw hole
30 screw
50 shelf part
51 end
61 locking groove
62 protrusion part
63 hooked protrusion part
100 automobile
110 back seat
120 luggage compartment
130 luggage compartment floor
140 back door
150 side wall

The invention claimed is:

1. A light-blocking member comprising:
a substantially rectangular sheet member;
a bendable and deformable wire that is attached to said sheet member so as to surround an outer peripheral part of said sheet member; and
handle members that are attached to both ends of one side of said sheet member and that are fixed to said wire,
wherein each of the handle members includes an upper surface and a lower surface, the lower surface being on an opposite side of the handle member from the upper surface,
wherein each of the handle members includes a recessed part on the upper surface that specifies a position for a predetermined finger when a user holds the handle member, and
wherein each of said handle members includes a protrusion part on the lower surface that specifies a position for another finger when said user holds the handle member is formed.

2. The light-blocking member according to claim 1, wherein
said handle members have two engagement members that engage with each other while said sheet member and said wire are sandwiched between said two engagement members.

3. The light-blocking member according to claim 1, comprising
locking parts that are provided on a first surface side of said sheet member in one of the handle members attached to said both ends, and on a second surface side opposite to said first surface side of said sheet member in the other of said handle members, and that engage with each other.

4. The light-blocking member according to claim 1, comprising
a hooked protrusion part provided in one of the handle members attached to said both ends; and a locking groove that is provided in the other of said handle members, and is locked to said hooked protrusion part by insertion of said hooked protrusion part into said locking groove.

5. A light-blocking structure comprising:
the light-blocking member according to claim 3; and
a shelf part that allows said light-blocking member to be placed thereon, wherein
said locking part is used as a shelf positioning part that comes into contact with one end of said shelf part to determine a position of said light-blocking member on said shelf part.

* * * * *